United States Patent
Lenz, Jr.

(10) Patent No.: US 8,540,302 B2
(45) Date of Patent: Sep. 24, 2013

(54) ADJUSTABLE LENGTH TRUCK BED COVER WITH REMOVABLE SIDE PANELS AND METHOD OF INSTALLATION AND REMOVAL

(76) Inventor: Arthur W. Lenz, Jr., Papillion, NE (US)

( * ) Notice: Subject to any disclaimer, the term of this patent is extended or adjusted under 35 U.S.C. 154(b) by 62 days.

(21) Appl. No.: 13/135,093

(22) Filed: Jun. 24, 2011

(65) Prior Publication Data

US 2011/0316302 A1 Dec. 29, 2011

Related U.S. Application Data

(60) Provisional application No. 61/398,343, filed on Jun. 24, 2010.

(51) Int. Cl.
*B60P 7/02* (2006.01)
*B23P 17/04* (2006.01)

(52) U.S. Cl.
USPC ........................................ 296/100.03; 29/428

(58) Field of Classification Search
USPC ................. 296/100.04, 100.05, 165
See application file for complete search history.

(56) References Cited

U.S. PATENT DOCUMENTS

| | | | | |
|---|---|---|---|---|
| 2,756,468 | A | * | 7/1956 | Bright .......................... 49/490.1 |
| 3,124,386 | A | * | 3/1964 | Jonas ............................. 296/176 |
| 4,289,346 | A | * | 9/1981 | Bourgeois ..................... 296/105 |
| 4,659,136 | A | * | 4/1987 | Martin et al. ............. 296/100.04 |
| 4,784,429 | A | * | 11/1988 | Hodges ......................... 296/165 |
| D310,806 | S | * | 9/1990 | Hertzberg et al. ........... D12/403 |
| D327,463 | S | * | 6/1992 | Williams ..................... D12/403 |
| 5,156,195 | A | * | 10/1992 | Wehler et al. ................. 160/202 |
| 5,203,603 | A | * | 4/1993 | Hertzberg et al. ....... 296/100.03 |
| 6,997,502 | B1 | * | 2/2006 | Reents ..................... 296/100.03 |

* cited by examiner

*Primary Examiner* — Glenn Dayoan
*Assistant Examiner* — Sunsurraye Westbrook
(74) *Attorney, Agent, or Firm* — Philip J. Lee

(57) ABSTRACT

A cover assembly and a method of covering a cargo bed for a truck having a separate cab uses a raised structure with removable side panels, constructed and arranged in sections of successively smaller width and height dimensions, the cover sections being slideably mounted within grooves on side rails that are secured to the sides of the cargo bed so that the smaller sections can be either extended, with the smallest section is toward the rear of the cargo bed or retracted into the largest section, and locking pins are provided to secure the cover sections in the desired locations, the method of installation and removal being to install the cover sections in order of size with the smallest sections installed first and the largest sections removed first.

15 Claims, 10 Drawing Sheets

ADJUSTABLE LENGTH TRUCK BED COVER WITH REMOVABLE SIDE PANELS AND METHOD OF INSTALLATION AND REMOVAL

CROSS REFERENCE TO RELATED PROVISIONAL APPLICATION

This application claims the benefit of U.S. Provisional Application No. 61/398,343, filed Jun. 24, 2010.

BACKGROUND OF THE INVENTION

A. Field of Invention

The present invention relates generally to covers for cargo beds of trucks, and more particularly to a telescoping cover for the cargo bed of a light truck, with removable side panels.

B. Description of Related Art

Conventional light trucks, commonly known as pickup trucks feature an open cargo bed that has short sides and an open top and that is accessible from the top and/or through a tail gate or door at the rear of the cargo bed, the cargo bed extending from the back of the cab to the tail gate. Numerous covers exist to close the open top of the cargo bed to protect cargo, tools, or other contents from the weather elements and to protect against theft as well. Such conventional covers are commonly referred to as shells as they consist of a simple outer covering extending laterally between the sides and lengthwise from the cab to the tailgate. Since the cargo bed top is usually the full size of the cargo bed and larger than the tailgate opening, it is desirable for a covering to be easily removable to either accommodate oversized loads that require greater volume than is available within a covered cargo bed or to allow loading the cargo bed through the open top. Such covers may be made to be relatively light in an attempt to ease the processes of installing and removing the cover; however, since the usual usage is utilitarian, durable construction is preferred. In addition, the conventional covers are formed in a single piece in the size of the cargo bed to be covered. Accordingly, the process of installation requires lifting the entire cover into position atop the cargo bed sidewalls, which is difficult if not impossible to be performed by a single person. The removal process likewise requires lifting the cover up and off the cargo bed sidewalls and similarly cannot easily be performed. In addition to the weight of conventional one-piece covers, such covers are very awkward to handle by a single person.

Further, the need to cover the cargo bed of a light truck may be limited to an area that is significantly less that the entire bed as when boxes of small tools, power equipment, or the like need to be protected but leave a useful amount of the cargo bed for cargo or other large items that do not need to be protected or cannot fit within a covering. Accordingly it would be desirable to be able to cover only a portion of the cargo bed when needed. An additional variable in truck bed cover desired configurations is the height of the side walls of a truck bed cover, which range from tonneau type flat covers with little or no height above the truck sidewalls to camper type covers with high side walls.

It would therefore be desirable to provide a cargo bed cover that is easily installable and removable by a single person and of adjustable length and height to protect less than all of the cargo bed when desired and to open and uncover some or most of the cargo bed, as desired.

SUMMARY OF THE INVENTION

The device of the present invention is a truck cargo bed cover of adjustable length comprising an assembly of a number of cover sections of successively smaller size to be attached to the top of the sidewalls of the cargo bed. Each section comprises two runners and a top cover extending upward from one runner, laterally across the width of a standard truck bed and then downward to the other runner. At least two rail sections, one secured to each of the truck bed sidewall top sections, extend lengthwise along the top of the sidewalls of a truck bed and comprise a number of tracks to receive the cover section runners on each side. The cover sections may include removable side panels, which may include windows, and which are installed between the runners and the downward edges of the top cover. The cover sections are supported and secured by the engagement of the cover section runners within the tracks such that the cover sections can be moved in a lengthwise direction over the truck bed. Each track is formed with a keyhole type cross section with an inner section and an outer slot, the inner section having a larger width dimension that the slot. Each runner comprises an enlarged edge having a width greater than the inside width dimension of the track slot and slightly less than the inside width of the track inner section. The tracks are horizontally arrayed on the rail section, with the tracks extending from end to end along the rail. When secured to the top of the truck bed side wall, the rail sections are secured with the slots facing upward and away from the truck bed with closed track ends toward the forward end of the bed, toward the truck cab, and open track ends toward the rear of the cargo bed and the tailgate. The number of tracks is at least equal to the number of cover sections to be used. Each cover section comprises an inwardly protruding flange alone the edge of the sides and top of the cover section at one end thereof and an outwardly protruding flange alone the other edge of the sides and top of the cover section. Both flanges are sized and angled such that beginning with the largest cover section, the inward flange engages with the outward flange of the next smaller cover section. The opposing flanges are preferably formed with two right angle corners to form a reverse direction element that engages the opposing flange. Elastomeric seals on opposing surfaces between the flanges may be used to seal the interior of the covered bed against the elements. The end of the largest cover section toward the front of the truck bed is covered by a removable flat panel secured to the foremost end of the largest cover section. A window in the front panel may be desirable to allow viewing the cargo bed contents from the truck cab. The end of the smallest cover section toward the tail gate end of the truck bed is covered by a hinged lid that is sized and formed to engage the truck tailgate to shut the tailgate end of the cargo bed. The rear cover lid is conveniently hinged at the top of the cover. Locking rods inserted through the rail section material into the track inner sections are used to releasably lock the runners in position along the rail upon assembly. A stop plate is removably secured across the track ends toward the tailgate end of the cargo bed to prevent and cover sections from sliding off the rails inadvertently.

One or more of the smaller cover sections may be retracted toward the cab end of the cargo bed by raising and disengaging the appropriate lock rod and sliding the cover section to the desired location. In this manner, all of the smaller cover sections can be retracted under the largest cover section to cover only a portion of the cargo bed if desired. All or some of the retracted cover sections may be positioned at convenient locations along the rails, including, at either end of the rails. The entire assembled device can be removed or installed in a conventional manner by releasing the rails from the truck sidewall top flange and lifting the entire assembly at the same time. A more convenient method of removal comprises first removing the front panel and then removing the cover sections one at a time beginning with the largest section and removing the rest of the cover sections in order of successively smaller sections. The cover sections are removed from the rails by first removing the stop plates from the tailgate end of the rails, loosening the cover section lock screws as required, and sliding the cover section backward off the rails. The rails may then be left on the truck or removed by releasing the rails from the truck bed sidewall top flange. The most convenient method of installation comprises the reverse operational order from the removal method.

The principle aim of the present invention is to provide a new and improved device that meets the foregoing requirements and is convenient and safe to assemble, install and use in multiple configurations.

Other objects and advantages of the invention will become apparent from the Description of the Preferred Embodiments and the Drawings and will be in part pointed out in more detail hereinafter.

The invention consists in the features of construction, combination of elements and arrangement of parts exemplified in the construction hereinafter described and the scope of the invention will be indicated in the appended claims.

DESCRIPTION OF THE PREFERRED EMBODIMENT(S)

Figure 1:
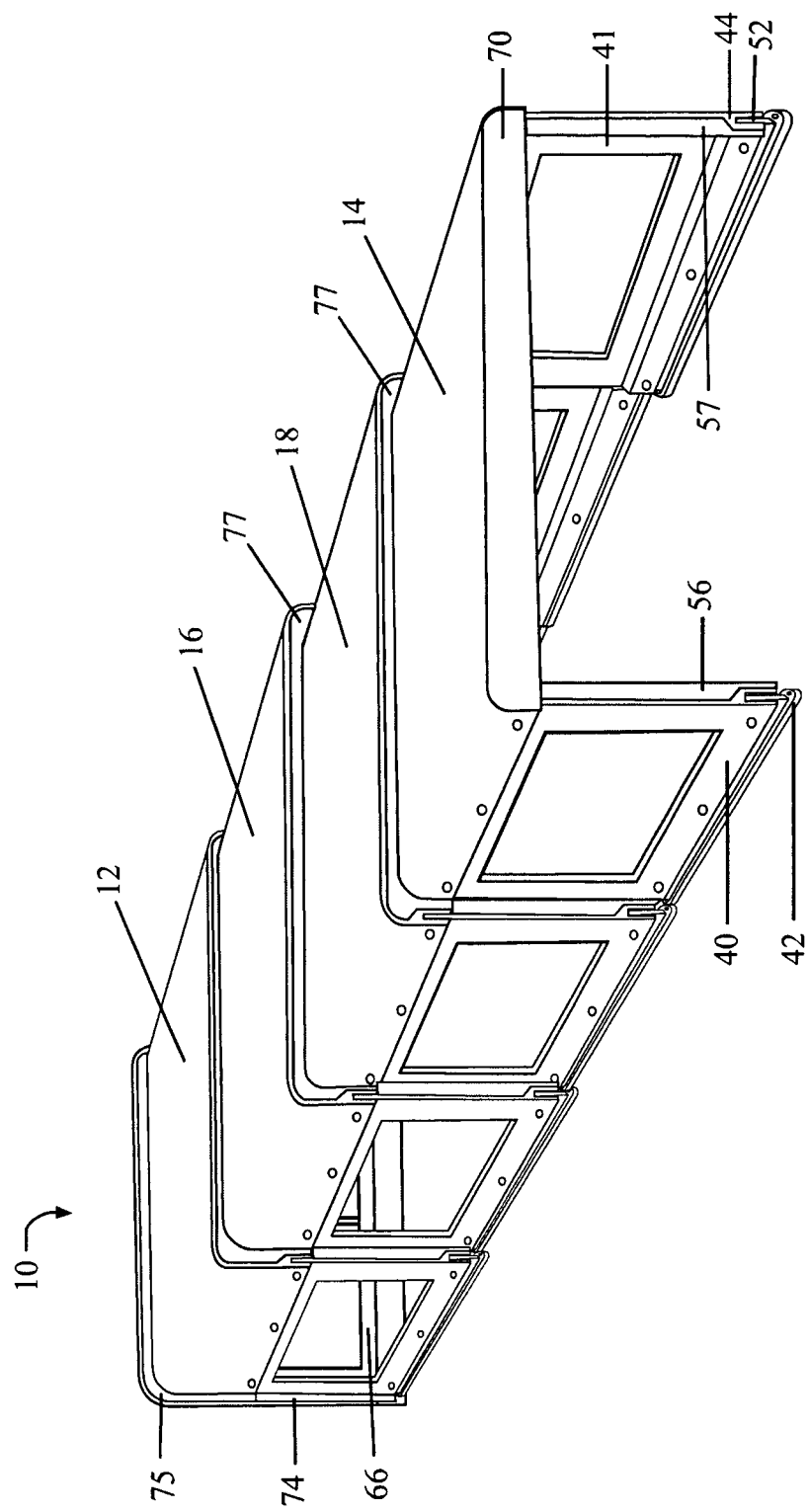
FIG. 1 is a perspective view of assembled cover sections of a device according to the present invention in fully extended position, with side panels.
Figure 2:
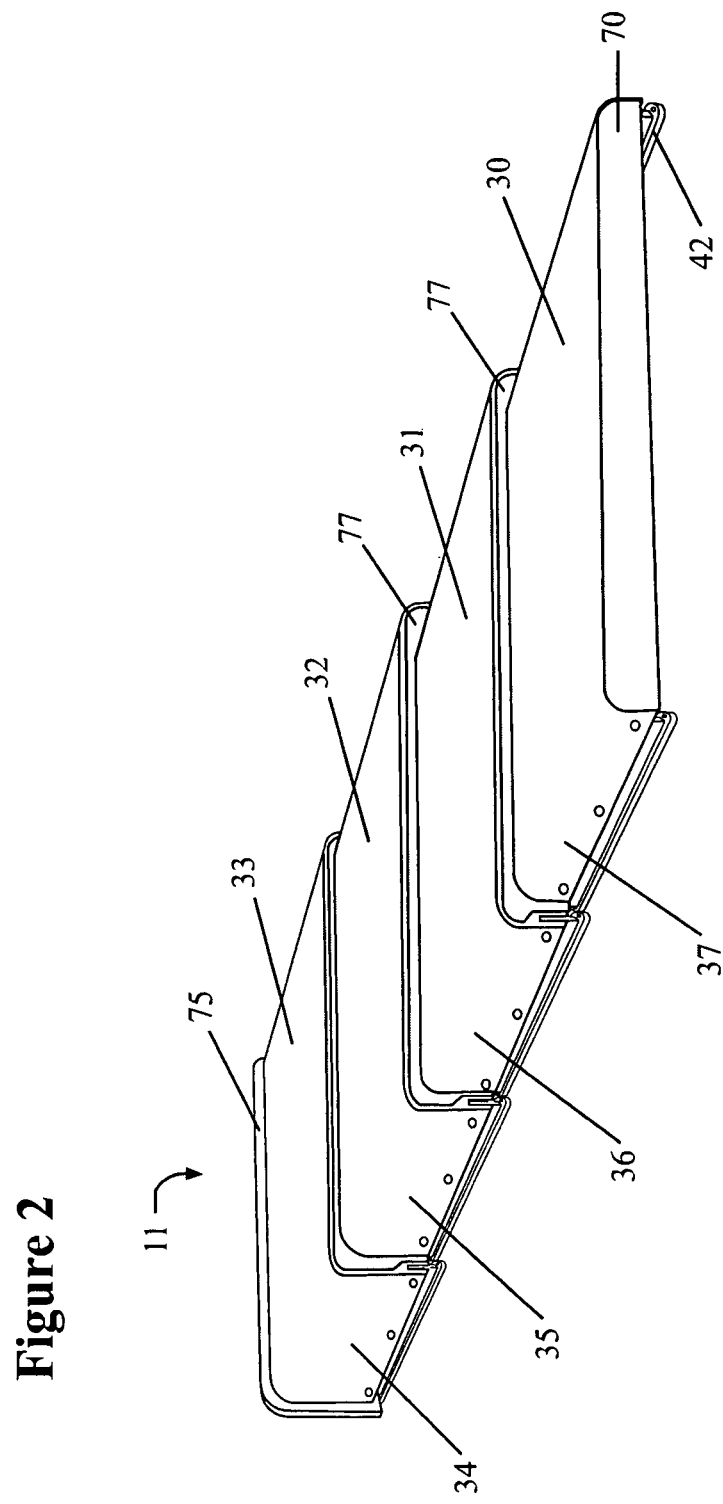
FIG. 2 is a perspective view of assembled cover sections of a device according to the present invention in fully extended position, without side panels.
Figure 3:
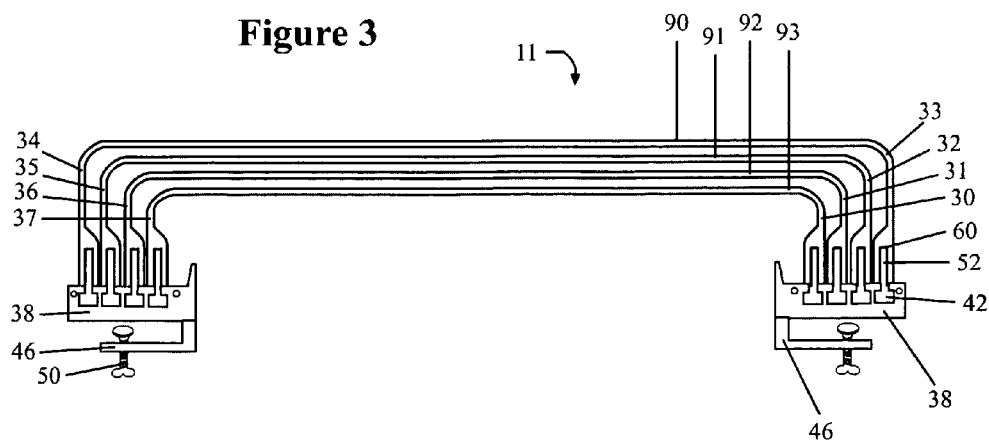
FIG. 3 is a cross section view of a second preferred embodiment of an assembled device according to the present invention.
Figure 4:
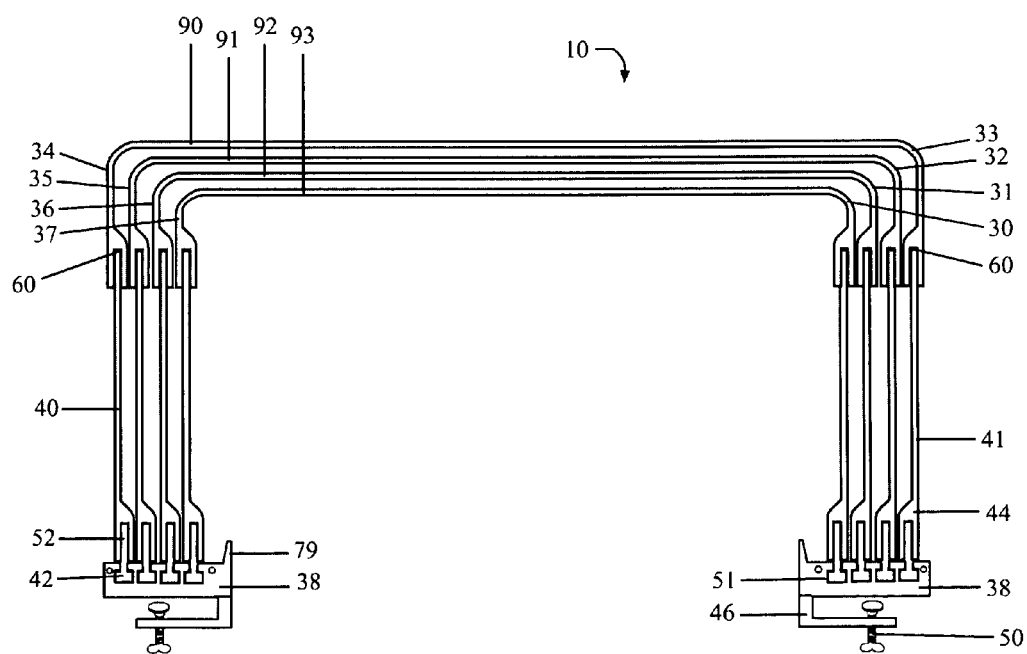
FIG. 4 is cross section view of a first preferred embodiment of an assembled device according to the present invention.
Figure 5:
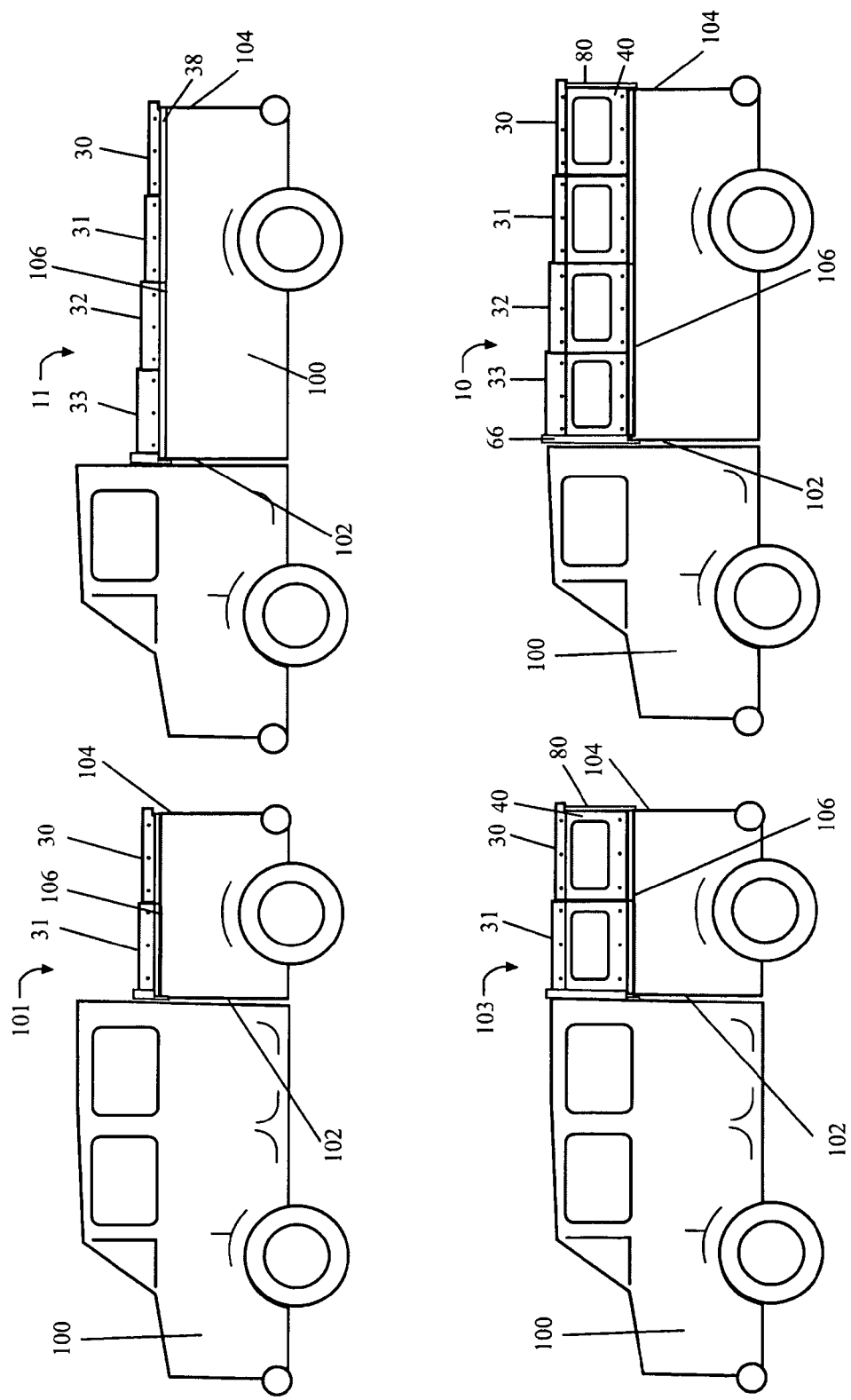
FIG. 5 shows side views of first and second preferred embodiments of a device according to the present invention installed on a truck with either two or four cover sections.
Figure 6:
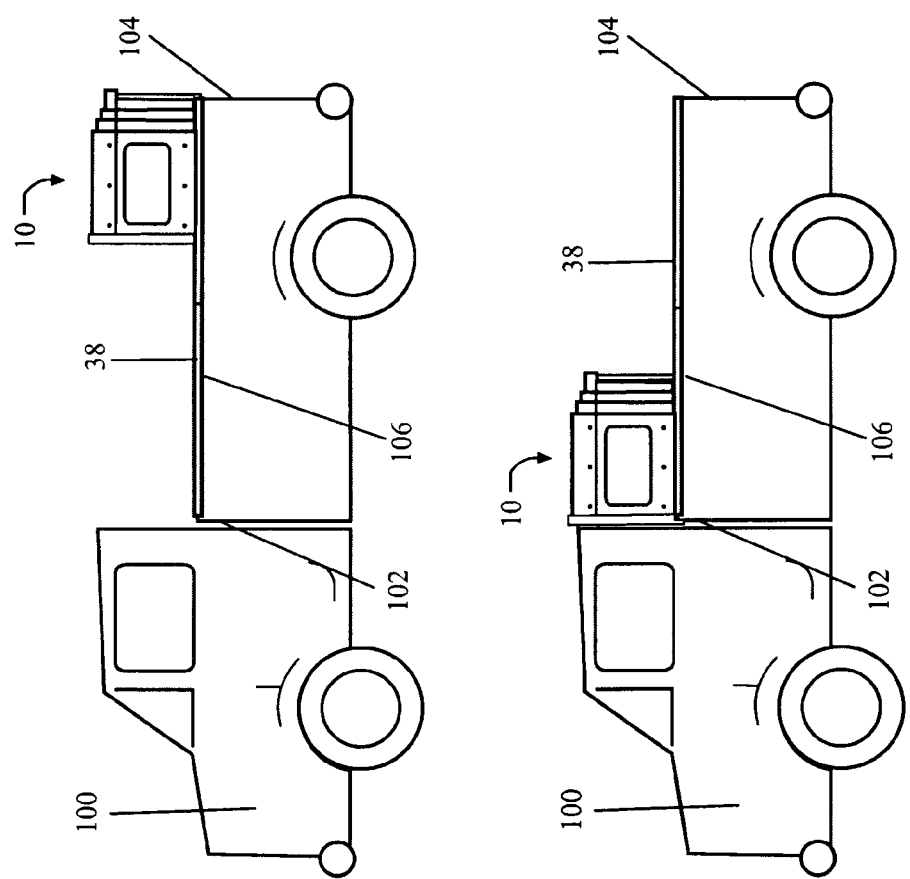
FIG. 6 is a side view of a retracted first preferred embodiment of a device according to the present invention, in two different positions.
Figure 7:
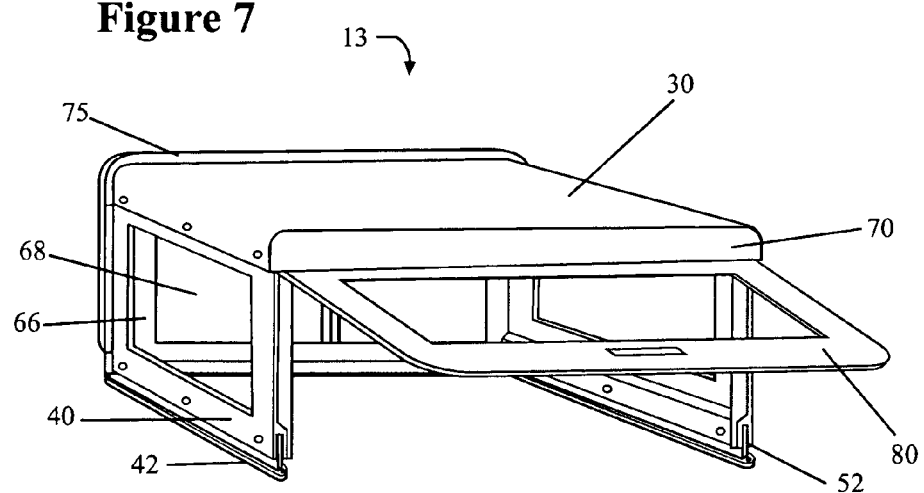
FIG. 7 is a perspective view of a single cover section of an embodiment of a device according to the present invention.
Figure 8:
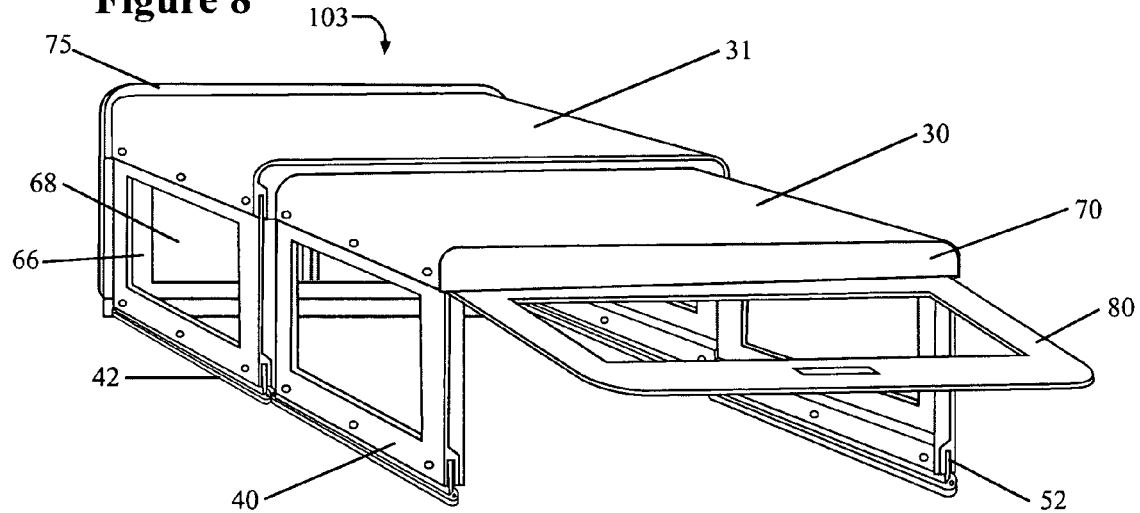
FIG. 8 is a perspective view of an embodiment of a device according to the present invention with two cover sections.
Figure 9:
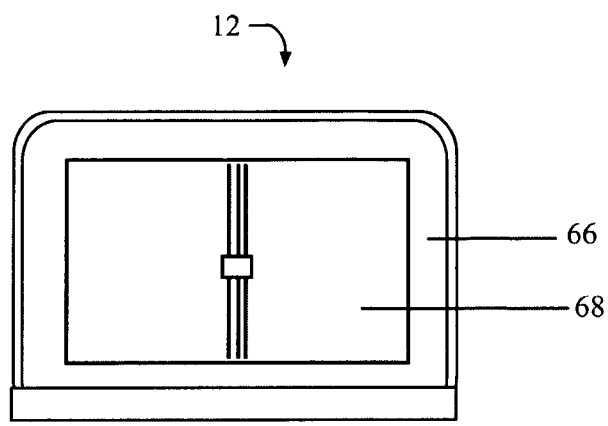
FIG. 9 is a rear view of a front panel of a first preferred embodiment of a device according to the present invention.
Figure 10:
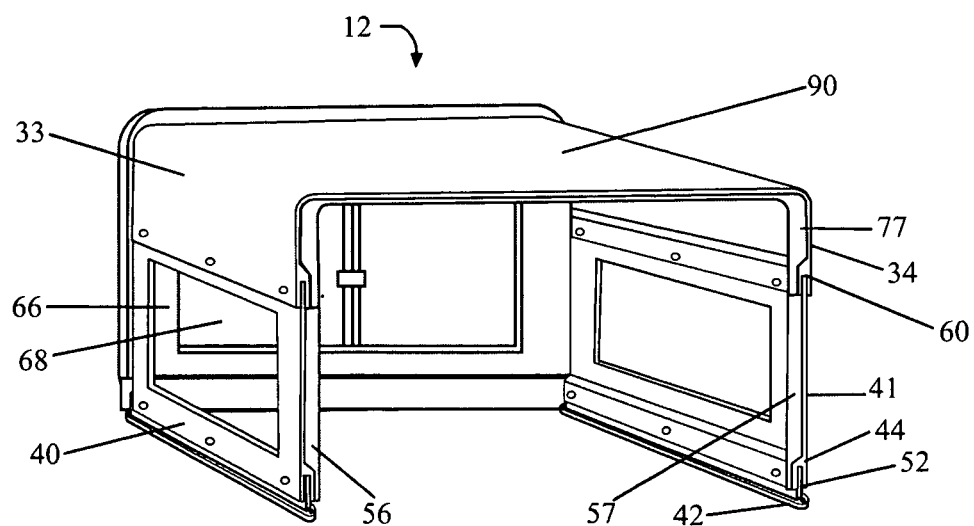
FIG. 10 is a perspective view of a largest cover section of a first preferred embodiment of a device according to the present invention.
Figure 11:
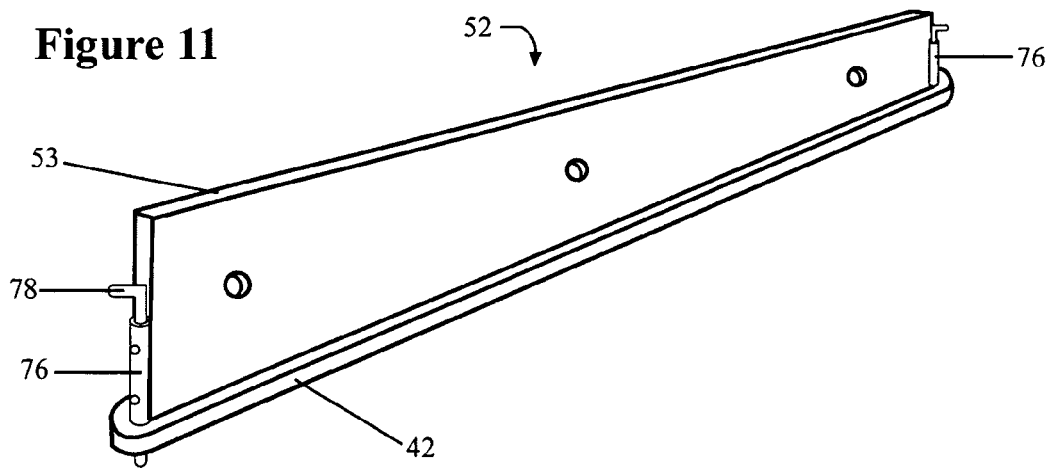
FIG. 11 is a perspective view of a runner for a device according to the present invention
Figure 12:
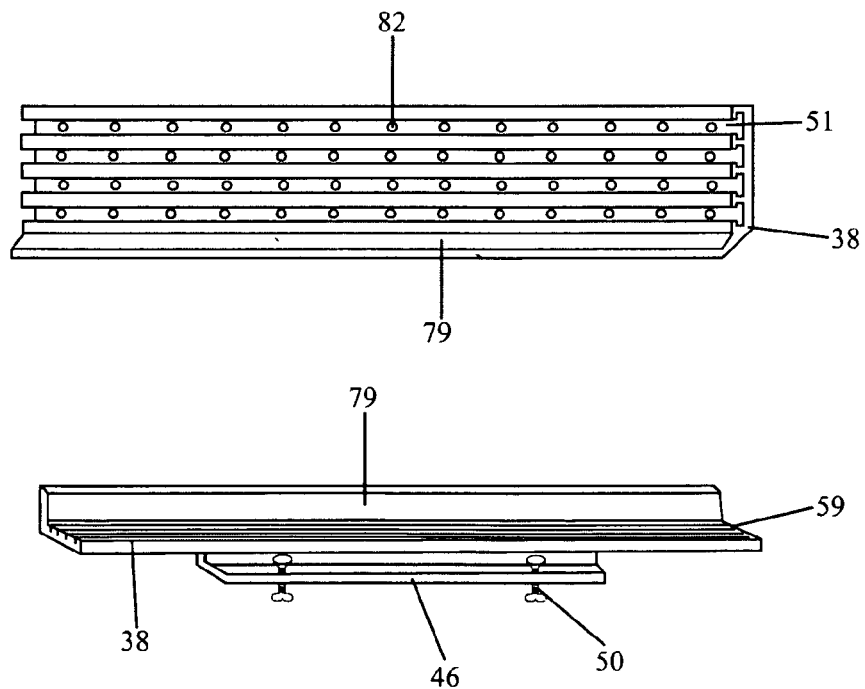
FIG. 12 is side and top perspective views of a rail member of a device according to the present invention
Figure 13:
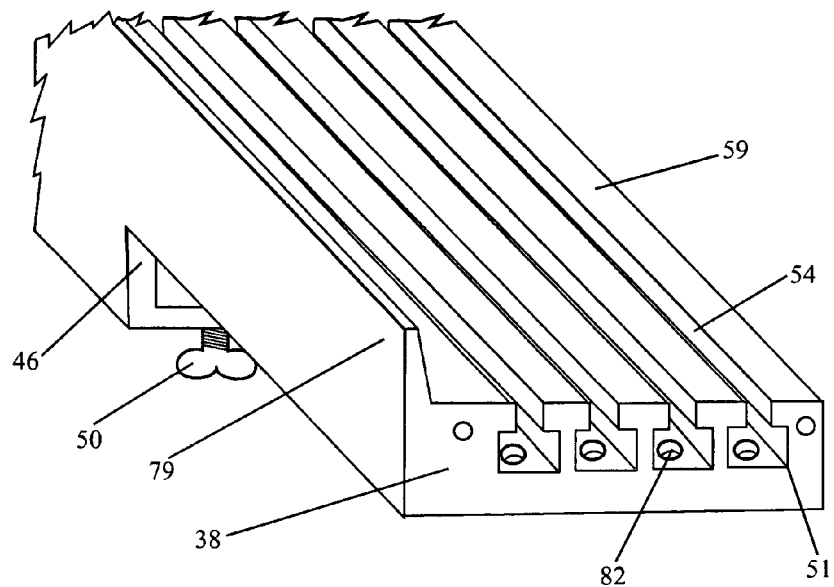
FIG. 13 is a top perspective view of a portion of a rail member of a device in accord with the present invention.
Figure 14:
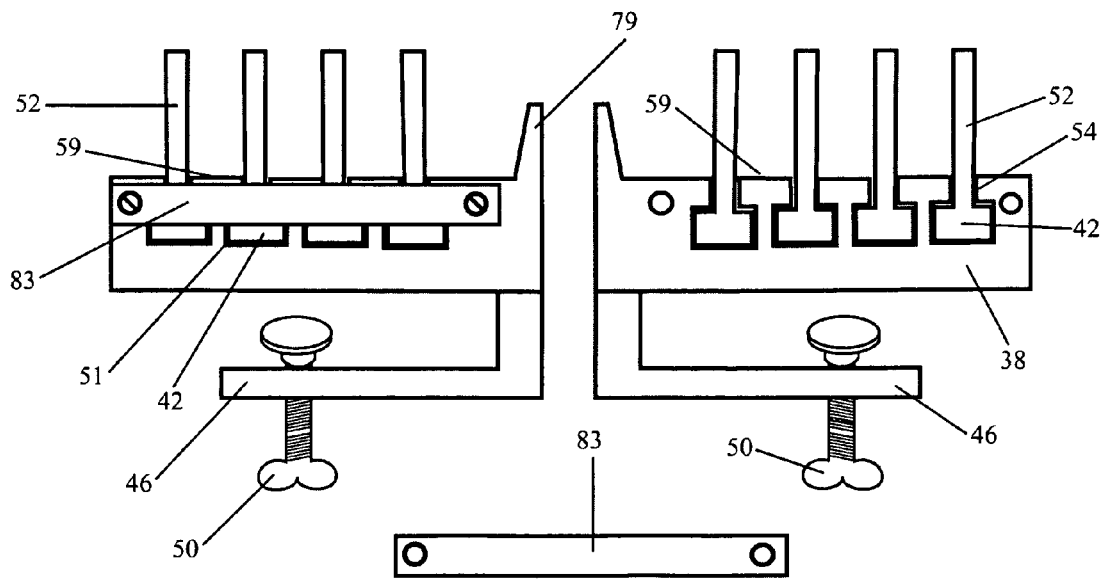
FIG. 14 is end views of rail members of a device in accord with the present invention with runners inserted therein.
Figure 15:
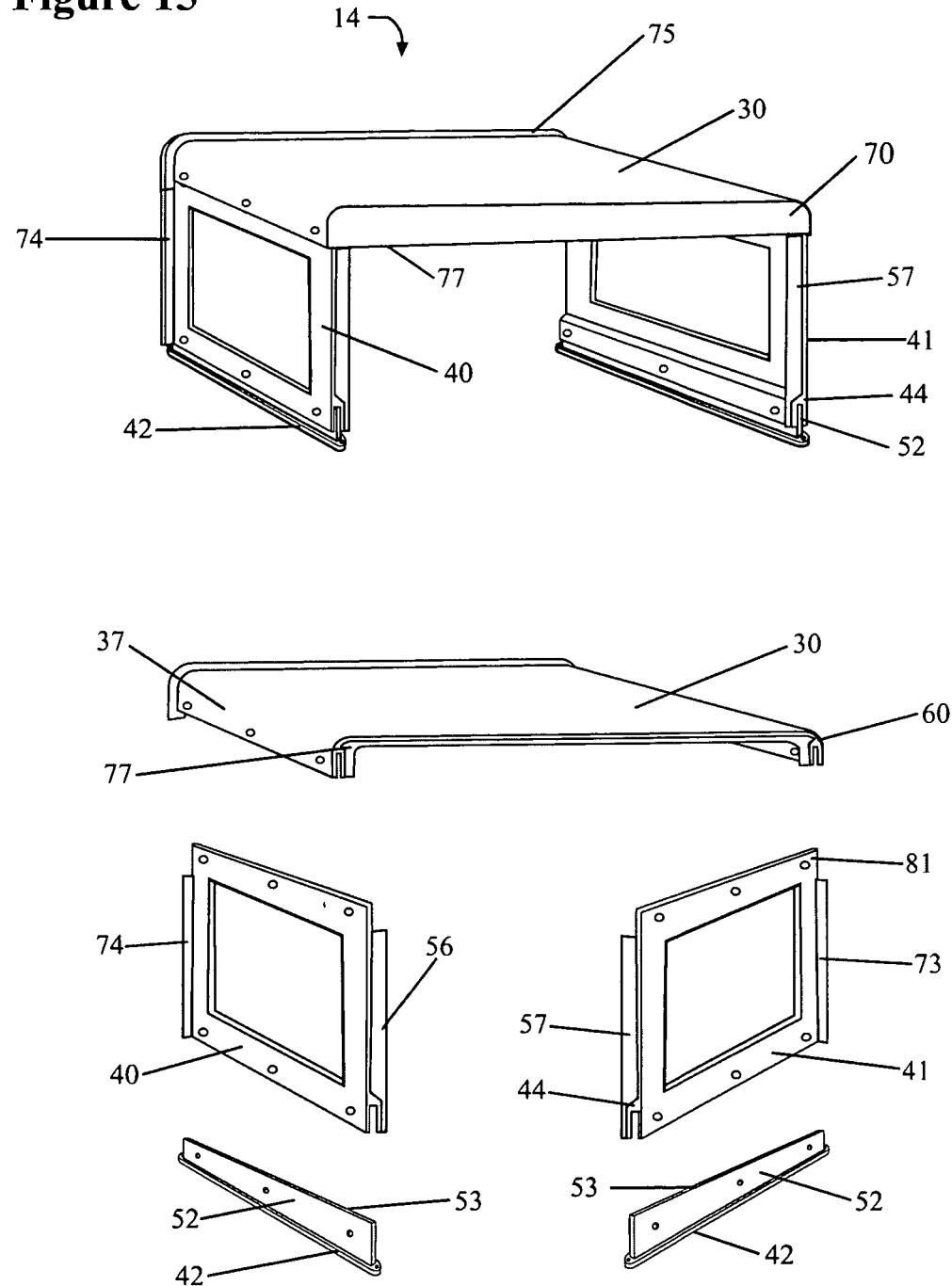
FIG. 15 is a perspective view of the smallest cover section of a first preferred embodiment of a device in accord with the present invention, in assembled and disassembled states.

With reference to the Drawings wherein like numerals represent like parts throughout the Figures, a first preferred embodiment of a device of the present invention for adjustably covering all or some of the cargo bed of a truck is generally designated by numeral 10 in FIGS. 1, 4, 5 and 6. A second preferred embodiment of a device of the present invention for adjustably covering all or some of the cargo bed of a truck is generally designated by numeral 11 in FIGS. 2, 3, 5 and 6. All dimensions referenced herein are intended as examples and not as limitations with the exception that modifications to one dimension may require modification of other dimensions as well. For ease of description and to provide an example of one use of the invention, device 10 or 11 is described herein are with reference to common configurations of pick up trucks in view of the popularity of such trucks, and can readily be modified for use in other sized cargo beds, whether on trucks or on trailers. As a further convenience in description, directional references such as "front" or "back", "upward" or "downward", "above" or "below", "forward" or "rearward" and the like may be used herein to describe positions and relations relative to a device of the present invention as normally installed over the bed of a typical truck. A conventional pick up truck is shown and designated by the numeral 100 and has a cargo bed with a cab end 102 and a rear or tail gate end 104 with side walls extending between ends 102 and 104. The truck bed sidewalls each have a top flange, designated 106 on the truck 100. Device 10 or 11 comprises an assembly of a number of cover sections of successively smaller size, beginning with the largest section 12 to be installed in the foremost position immediately behind the cab of a truck as shown in FIGS. 1 and 2, and ending with the smallest and rearmost section 14, with intermediate sections 16 and 18 therebetween. Alternatively, intermediate sections may be added or removed as necessary to adequately and efficiently cover the truck bed. An embodiment of the device of the present invention adapted for a short truck bed comprising only two cover sections is designated by reference numeral 103 and shown in FIGS. 5 and 8, and an embodiment of the device of the present invention adapted for a short truck bed comprising only one cover section is designated by reference numeral 13 and shown in FIG. 7. Yet another assembly featuring two retractable sections of minimal height is designated by reference numeral 101 and shown in FIG. 5.

Each section 12, 14, 16, and 18 comprises at least a top cover 30, 31, 32 or 33, which are in top plan view rectangular with two parallel sides, a front end and a rear end, and two runners 52, one runner 52 installed on each side. Each top cover 30, 31, 32, and 33 comprises two sidewalls 34, 35, 36, or 37 with a horizontal top section 90, 91, 92, or 93, each of which extends between and separates two sidewalls, which extend downward from the lateral side edges of the horizontal top section. The top cover 33 of the largest cover section 12 is wider and taller than the top cover 32 of next smaller cover section 16, the top cover 32 of which is wider and taller than the top cover 31 of next smaller cover section 18, the top cover 31 of which is wider and taller than the top cover 32 of next smaller cover section 14, the smallest cover section. Therefore, top cover sidewalls 34 are taller than top cover sidewalls 35, which are taller than top cover sidewalls 36, which are taller than top cover sidewalls 37, and the horizontal top section 90 of top cover 33 is wider than the horizontal top section 91 of next smaller top cover 32, and the horizontal top section 91 of top cover 32 is wider than the horizontal top section 92 of next smaller top cover 31 and the horizontal top section 92 of top cover 31 is wider than the horizontal top section 93 of next smaller top cover 30, which is the smallest top cover. A downward opening slot 60 is formed in the lower edges of each of the top cover sidewalls 34, 35, 36, and 37, and slot 60 extends the entire length of the top cover sidewalls.

Slot 60 is sized to securely and removably receive the top 53 of any runner 52. Each runner 52 is as long as the cover sections 12, 14, 16, and 18 and comprise a top portion 53, generally shaped as a rectangular plate with a straight and flat top and sides with a uniform thickness. The bottom edge of any runner 52 forms a bead 42 that is straight and of rectangular cross section. At both ends runners 52 comprise a sleeve 76 that receives a retractable locking pin 78, which is long enough to extend below the bottom of runner bead 42. Locking pin 78 and sleeve 76 comprise a detent to hold pin 78 in place in either a downwardly extended position or a retracted position.

The preferred embodiments 10 and 103 differ from embodiments 11 and 101 only in the inclusion in assemblies 10 and 103 of side panels 40 and 41, which are installed vertically between the lower edges of the top cover sidewalls 34, 35, 36, and 37 and a runner top portion 53. Side panels 40 and 41 may be of any chosen height and are not present in assembly 11 or 101. Side panels 40 and 41 are similar to each other in general size and shape and comprise a top edge 81 similar to the top edge 53 of the runners 52 and are sized to fit within top cover sidewall slots 60, in which they are secured in preferred embodiments 10 and 103. Side panel 40 is intended to be installed on the left side of assembled cover sections and side panel 41 is intended to be installed on the right side of assembled cover sections. Side panels 40 and 41 are formed with bottom edge having a downward facing slot 44, similar in shape and function to the top cover sidewall slots 60 and in device 10 receive the top 53 of runners 52. Side panels 40 and 41 are the same length as the top covers 33, 32, 31, and 30 and runners 52. Side panels 40 and 41 are different from each other in the placement of flanges that extending in opposing directions at the front and rear ends of the panels. At the front end of panel 40, a flange 74 extends outward and at the rear end of panel 40 flange 56 extends inwardly. A similar flange 73 extends outward at the front end of panel 41 and at the rear end of panel 41 flange 57 extends inwardly. Flanges 73 and 74 are designed and formed to join a similarly configured outward extending flange 75 positioned on the foremost edge of top covers 33, 32, 31, and 30 and rearmost side panel flanges 56 and 57 are similarly designed and formed to join an inwardly extending flange 77 positioned on the rearmost edge of top covers 33, 32, and 31. A slightly differently shaped inward flange 70 is formed at the rearmost edge of the smallest and rearmost top cover 30, flange 70 being adapted to accept and support hinges for a rear hinged lid 80, which closes the rear end of device 10. Inward flanges 73 and 74 are shaped to sealingly engage adjacent outward flanges 56 and 57, and flanges 75 are shaped to sealingly engage adjacent flanges 77, when two or more cover sections are used and extended to full length. Flanges 56, 57, 73, 74, 75, and 77 may be surfaced with a resilient material and/or rolled or turned backward in a "C" shape to provide enhanced sealing and structural strength.

Rail members 38 are formed in lengths suitable to fit on the truck bed sidewall top flanges 106 or in useful fractions thereof. For example only, rail members 38 may be formed in eight foot or four foot lengths to accommodate the usual bed lengths. Multiple rail members 38 may be combined to achieve the length desired. Rail members 38 comprise a clamp bracket 46 in which a locking screw 50 is threaded to securely fix the rail member 38 to the truck bed sidewall top flange 106. Rail sections 38 comprise a flat upper surface 59 that is as long as the rail member 38 and as wide as is necessary to fit atop the truck bed sidewall top flange 106 and accommodate the desired number of tracks 51, with enough spacing to provide for adequate clearance between the cover sections. Tracks 51 are formed as grooves in rail member top surface 59, extending lengthwise and parallel for the length of rail member 38. Tracks 51 are shaped with a keyhole type cross section with an upward facing slot 54 and an inner chamber 55 of greater width than slot 54, rail member slot 54 being about the same or slightly greater width than slots 60 and 44, sized to slidingly receive the top portion 53 of cover section runners 52 and not as wide than runner bead section 42, and inner chamber 55 is sized and shaped to slidingly receive runner bead section 42, being similarly rectangular in cross section. Holes 82 are formed in the bottom of track inner chamber at regular intervals along the length of tracks 51, sized to accept locking pins 78. Tracks 51 are horizontally arrayed and spaced across the rail section 38 extending along the rail surface 59 from end to end. The edge of rail member 38 from which bracket 46 extends downward also includes an upwardly projecting flange 79 that extends the length of rail member 38 to prevent leakage of rainwater into the truck bed. On installation flange 79 will be positioned toward the inside of the truck bed.

When all embodiments of the present invention are assembled and installed, cover section runners 52 that have been attached and secured to the cover sections are inserted into the tracks 51, with the runners 52 attached to the largest cover section inserted into the most lateral tracks 51, and the runners 52 that are attached to the next smaller cover section are inserted into the next, more central tracks 51. For example, in device 10, runners 62 attached to the largest cover section 12 are inserted into the most lateral tracks 51 and runners 62 attached to the smallest cover section 14 are inserted into the most central tracks 51.

Upon installation, the rail sections 38 are secured to the truck cargo bed side wall top flanges 106, and each cover section 12, 14, 16 and 18 is supported over the truck bed and are able to be moved in a lengthwise direction over the truck bed. When secured to the top of the truck bed side wall, the rail sections 38 are secured by clamp screws 50 to truck bed sidewall flanges 106, with open track ends toward the rear 104 of the cargo bed and the tailgate. Locking pins 78 are extended downward in sleeve 76 to enter and engage a hole 82 to lock the cover sections in place to secure and position the respective cover section in the proper location. After assembly of the desired cover sections on the rail members, a stop plate 83 is removably secured across rearward ends of tracks 51 to prevent the installed cover sections from sliding off rails members 38 inadvertently.

A front panel 66 covers front end 62 of cover section 12 and the foremost end of the rail member tracks 51. A window 68 is provided in front panel 66 to allow viewing of or access to the cargo bed from the truck cab. Rearward end 58 of the smallest cover section 14 is covered by a hinged lid 80 that is sized and formed to engage a truck tailgate to shut cargo bed tailgate end 104. Hinged lid 80 is conveniently hinged to flange 70 at the top rear of cover section 14.

By retracting the appropriate locking pins 78 and sliding a cover section to the desired location, the extension of the installed device 10 or 11 may be varied. All of the smaller cover sections 14, 16, and 18 can be retracted under the largest cover section 12 to cover only a portion of the cargo bed if desired.

The entire assembled device 10 can be removed or installed in a conventional manner by releasing the rail section clamping screws 50 from the truck sidewall top flanges 106 and lifting the entire assembled device 10 at the same time. A more convenient method of removal comprises removing the cover sections one at a time beginning with the largest section 12 and removing the rest of the cover sections 16, 18, and 14 in order of successively smaller sections. The cover sections are removed from the rails by first removing the stop plates 83 from the tailgate end of the rails, lifting the cover section locking pins 78 from the engagement in holes 82, as required, and sliding the cover section backward off the rail members 38. The rail members 38 may then be left on the truck or removed by releasing the rails from the truck bed sidewall top flange. The most convenient method of installation comprises the reverse operational order from the removal method.

It will be anticipated that the device 10 may consist of a variety of configurations with other numbers of sections than the four sections shown in the drawings and therefore the number of tracks 51 may vary accordingly without departing from the invention.

While preferred embodiments of the foregoing invention have been set forth for purposes of illustration, the foregoing description should not be deemed a limitation of the invention herein. Accordingly, various modifications, adaptations and alternatives may occur to one skilled in the art without departing from the spirit and the scope of the present invention. It is specifically anticipated a variety of materials could be suitable for use in constructing device 10 without departing from the spirit of this invention. It is further anticipated that other uses and combinations of some or all of the components of assembly 10 will be found to be useful.

I claim:

1. A cover assembly for a cargo bed for a truck having a separate cab, the bed having a front end adjacent to the truck cab and an opposite, tail gate end and two parallel side walls extending from end to end on the sides of the cargo bed, the cover assembly comprising a plurality of top cover sections of similar lengths and successively smaller height and width dimensions, each top cover section having a rectangular horizontal top having a first, forward end, a second, rearward end and two parallel vertical sides extending between the first end and the second end, the sides of the smallest top cover section being separated by the width of the horizontal top of about at least about the same distance as the separation of the cargo bed side walls and having a minimal height, a rail member secured to each of the truck bed sidewalls, at least as many cover support members as there are top cover section sides, each cover support member being secured to a top cover section side and slidably mounted on a rail member.

2. The cover assembly of claim 1, further comprising as many flat side panel members as there are top cover section sides, all flat side panel members being of a uniform size and each flat side panel member is removably secured to and interposed between a top cover section side and a cover support member.

3. The cover assembly of claim 2, wherein wherein each flat side panel member and each cover support member comprise a similar top edge and each top cover section side and flat side panel comprises slot means to removably engage the top edge of either a flat side panel or a support member.

4. The cover assembly of claim 3, wherein each rail member further comprises an upward facing surface with a plurality of straight and parallel grooves horizontally arrayed parallel to each other on the upward facing surface of the rails and shaped to slidingly receive a cover support member.

5. The cover assembly of claim 4, wherein each cover support member extends the length of the cover section to which the cover support member is attached and further comprises a first, flat portion of a first width and a second, bead portion of a second width, greater than the first width of the support member flat portion, and each groove comprises an outer slot portion of a first width, slightly greater than the first width of the cover support member flat portion and an inner cavity of a second greater width, extending the length of the groove.

6. The cover assembly of claim 5, wherein the width of each support member bead portion is less than the width of each groove inner cavity and greater than the width of each groove slot portion.

7. The cover assembly of claim 6, further comprising clamping means to secure the rail members to a side wall of a truck bed.

8. The cover assembly of claim 7, wherein each rail member groove further comprises a plurality of recessed areas and each support member further comprises a pin and a bracket securing the pin in either a retracted position or an extended position to extend into a groove recessed area to secure the position of the support member within the groove.

9. The cover assembly of claim 8, wherein each top cover section first end comprises an outward extending seal and each top cover section second end comprises an inward extending seal.

10. The cover assembly of claim 9, wherein each top cover section side is secured directly to a support member and a flat side panel is not secured between the top cover section side and the support member.

11. The cover assembly of claim 10, wherein the vertical height of the sides and the horizontal width of each successively larger top cover section is increased relative to the next smaller top cover section. and each cover support member is the same height.

12. A method of installing a cargo bed cover comprising assembling a plurality of cover sections of about equal length and of successively smaller and minimal height and width dimensions, each cover section comprising a top having two parallel sides, and two support members removably secured along each one of two parallel sides, and two rail members having means to be secured to each side of a truck bed sidewall top and comprising a number of grooves on an upper surface, sized and shaped to receive the cover section support members, securing the rail members to the side walls of a truck cargo bed with the grooves facing upward, then installing the smallest cover section by inserting the support members into the grooves and sliding the cover section toward the front of the bed, then repeating the foregoing step installing each successively larger cover section in turn, and then securing the cover sections in place.

13. The method of claim 12, further comprising the step of securing a flat side panel interposed between the support members and top cover section sides and the final step of securing the position of the support members within the grooves.

14. The method of claim 13, further comprising covering the entire cargo bed.

15. The method of claim 14, further comprising covering less than the entire cargo bed.

\* \* \* \* \*